United States Patent [19]

Eriksson

[11] Patent Number: 4,591,075

[45] Date of Patent: May 27, 1986

[54] ACTIVATOR FOR FLUIDIZING SLOW-MOVING MATERIAL IN CONTAINERS

[75] Inventor: Hans E. Eriksson, Rönninge, Sweden

[73] Assignee: Norvale AB, Bandhagen, Sweden

[21] Appl. No.: 567,864

[22] PCT Filed: Mar. 25, 1983

[86] PCT No.: PCT/SE83/00103

§ 371 Date: Dec. 1, 1983

§ 102(e) Date: Dec. 1, 1983

[87] PCT Pub. No.: WO83/03401

PCT Pub. Date: Oct. 13, 1983

[30] Foreign Application Priority Data

Apr. 1, 1982 [SE] Sweden ............................ 8202101-5

[51] Int. Cl.[4] ............................................. B65G 69/06

[52] U.S. Cl. .................................... 222/195; 366/106; 406/90; 406/138; 248/95

[58] Field of Search .................. 222/195, 630; 406/90, 406/91, 138; 366/106; 248/95

[56] References Cited

U.S. PATENT DOCUMENTS

| | | | |
|---|---|---|---|
| 2,353,346 | 7/1944 | Logan | 406/88 |
| 2,805,897 | 9/1957 | Yellott | 406/90 |
| 2,943,891 | 7/1960 | Paton | 406/90 |
| 2,956,839 | 10/1960 | Hermanns | 406/138 X |
| 3,275,197 | 9/1966 | Eklund | 406/91 |
| 3,343,888 | 9/1967 | Anderson et al. | 406/138 |
| 3,645,583 | 2/1972 | Heath | 222/195 X |
| 3,669,317 | 6/1972 | Ivchenko et al. | 222/195 |

FOREIGN PATENT DOCUMENTS

| | | |
|---|---|---|
| 1781134 | 10/1970 | Fed. Rep. of Germany . |
| 7309287-6 | 2/1975 | Sweden . |
| 8003577-7 | 12/1981 | Sweden . |

*Primary Examiner*—Joseph J. Rolla
*Assistant Examiner*—Frederick R. Handren
*Attorney, Agent, or Firm*—Merchant, Gould, Smith, Edell, Welter & Schmidt

[57] ABSTRACT

Activator for fluidizing slow-moving material in fluid containers (10). The activator comprises a flat activator hose (15) which is suspended on a support member (16) arranged like a coat-hanger, a conduit (17) projecting into the activator hose between the layers thereof for the supply of pressurized gas pulses to the space between the front and rear layers of the activator hose. At least the front layer of the activator hose is gas-permeable and allows transmission of the pressurized gas pulses to the material in the container, a rhythmical movement simultaneously being imparted to the front layer in relation to the rear layer in pace with the pressurized gas pulses.

9 Claims, 8 Drawing Figures

ACTIVATOR FOR FLUIDIZING SLOW-MOVING MATERIAL IN CONTAINERS

Figure 1:
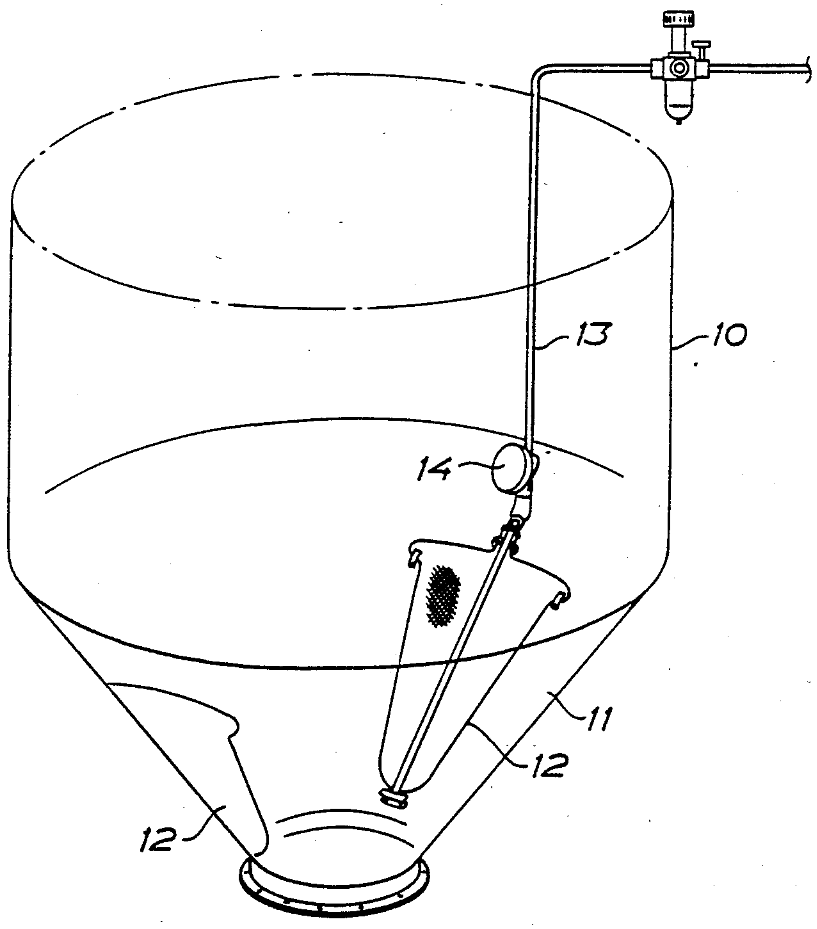

The invention relates to an activator for fluidizing slow-moving material in containers, comprising a flat element to be applied against the inside surface of the container wall and having a space defined between a front layer and a rear layer, which is closed at the margins of the element and has a connection for the supply of pressurized gas pulses to the space, the front layer intended to face the interior of the container being gas-permeable and being movable in relation to the rear layer so as to allow transmission of pressurized gas pulses when supplied to the material in the container, a rhythmical movement of the front layer in relation to the rear layer simultaneously being obtained in pace with the pressurized gas pulses.

In the Swedish published application No. 7309287-6 (publication No. 374,079) there is described an activator of this type wherein the rear layer comprises a panel which can be conformed to the inside surface of the container wall, and wherein the front layer consisting of a fabric is connected at the margins of this panel. The connection for the supply of the pressurized gas pulses comprises a socket projecting perpendicularly from the rear side of the panel and opening into the space between the panel and the fabric.

In the commercial embodiment of the activator of this type usually termed a panel activator, the fabric is folded around the edge of the panel and is glued to the rear side of the panel. The socket is used for attaching the activator to the container wall. It is passed through an opening in the container wall and is mounted by means of a screw connection. The pressurized gas pulses which in most cases are pressurized air pulses although an inert gas may be preferred for fluidizing specific materials, are supplied from a pulsator which is located outside the container and is fed from a pressurized gas source (pressurized air network). Usually, the pulse frequency is about 10 Hz.

The panel activator nowadays is a reliable auxiliary for discharging slow-moving materials from containers (silos) by allowing the material to flow through an outlet opening in the bottom of the container. Most often these containers have a conical or pyramidical bottom portion. With panel activators arranged on the inside surface of the container wall around the outlet opening even the most slow-moving materials can be fluidized successfully such that they will flow easily by gravity through the outlet opening. The activator takes up a small space only in the container and it can be adapted without any difficulty to different shapes of the container. Generally speaking, this activator can be tailored to the conditions prevailing in the specific case of use. The gas pulses transmitted through the gas-permeable front layer penetrate into the material and provide in combination with the rhythmical movement of this layer an "air vibration" in the material, which has turned out to be very efficient as far as the fluidization of the material is concerned.

Although the panel activator has proved to be in general solely advantageous in practice, one cannot disregard the fact that it provides in certain respects some disadvantages. Since it may be necessary to offer the panel activator in several different forms and sizes depending on the intended use thereof, it is necessary to keep in store a number of different standard embodiments and at times it is also necessary to supplement this storage by specifically manufactured embodiments. Both the storage and the manufacture of specific embodiments is expensive and disadvantageous for the manufacturer as well as for the user. Moreover, the panel activators are easily damaged and therefore must be packed very carefully for shipping and transport. In containers wherein not all walls are available from the outside, e.g. in silos two or more of which are built together, it may be difficult and cumbersome to effect mounting and connection of the panel activator. If the fabric forming the front layer should be damaged it is not possible to replace the fabric without dismounting the activator, which is cumbersome and timeconsuming, and for this reason it is not possible to satisfy the requirement raised from time to time, that it should be easy to clean or disinfect the activator. In many cases one and the same silo or container is used alternatingly for different materials which should not contaminate each other, and in that case cleaning is necessary at each change of material. In other cases materials may be involved which change to such extent if they are stored for too long a period that it may be necessary to clean regularly the activator in order to avoid that old material is collected at the activator e.g. between the panel and the inside surface of the container wall.

The purpose of the invention is to provide an activator which as to efficiency, utility and simple construction is commensurate with the panel activator now available but which does not have the disadvantages thereof.

Such an activator is advantageous primarily in view of the possibility to dismount in a simple manner the activator hose for cleaning and/or disinfection when required, and thus it is also easy to replace the activator hose, should it be damaged. The mounting in the container will be easier because the connection can be made to a flexible tube or a tube conduit extended into the container from the top thereof.

For the manufacture, the proposed activator provides a reduction of the storage, because the support member arranged as a coat-hanger can be conformed to different container shapes more easily than the panel of the prior art panel activator. Moreover, the activator of the invention can be packed more easily for shipping and transport.

Finally, the activator of the invention provides the advantage that the space at the rear side of the activator between the activator hose and the container wall can be blown off if also the rear layer is made at least to some extent gas-permeable, such that collection of material at the rear side of the activator can be avoided.

Figure 2:
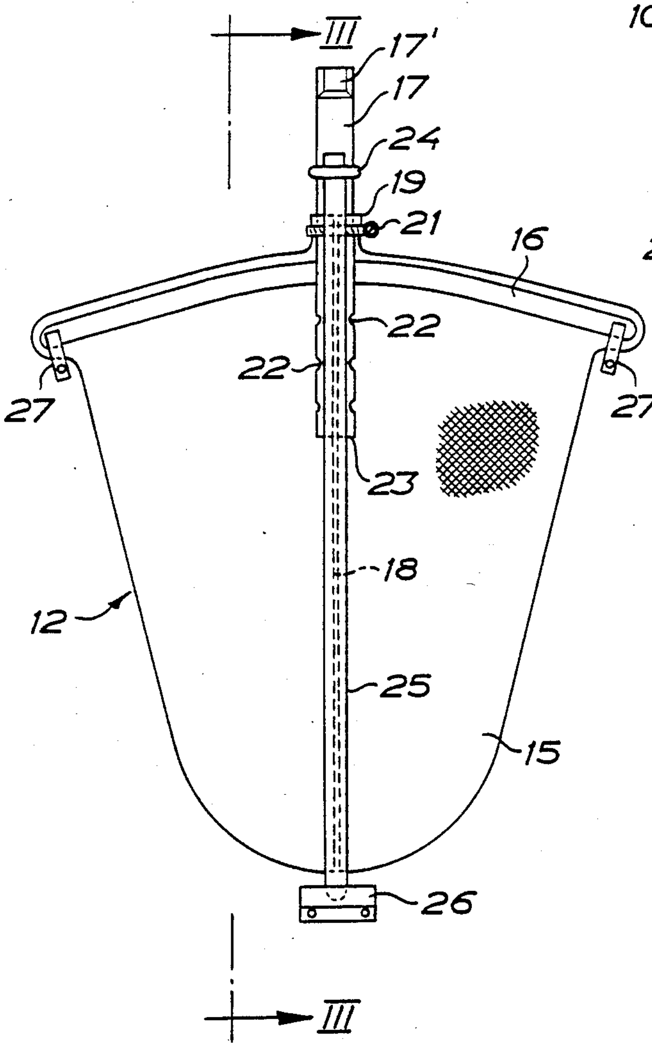
Figure 3:
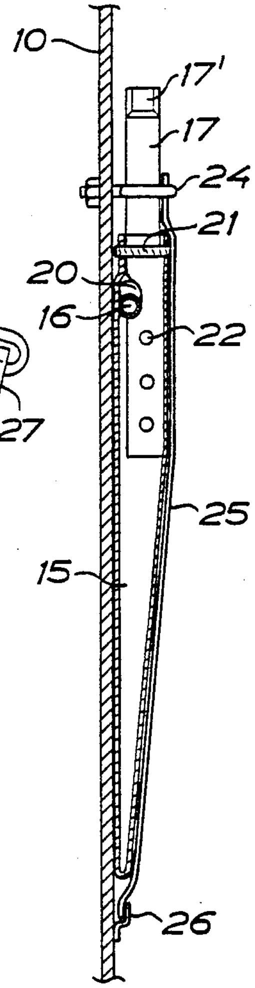
Figure 4:
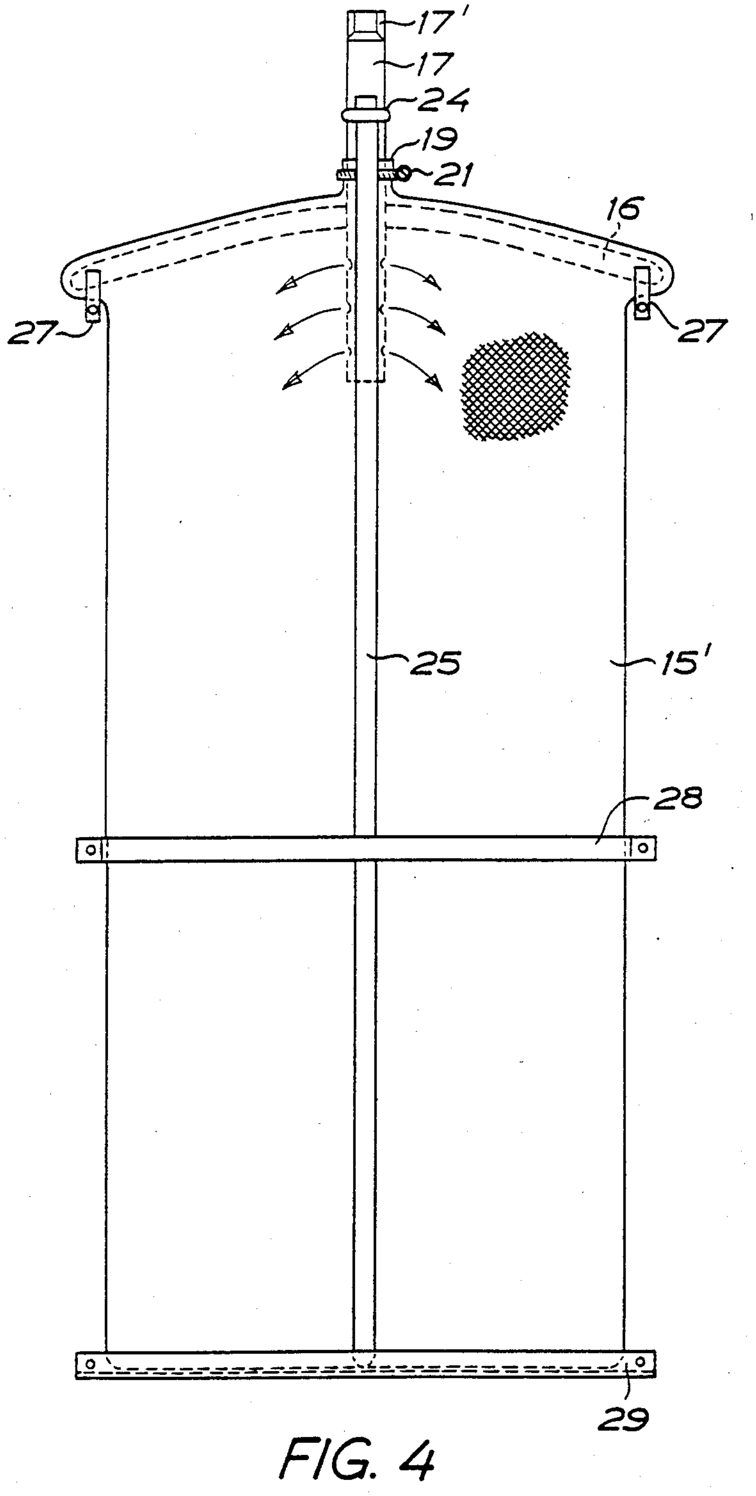
Figure 5:
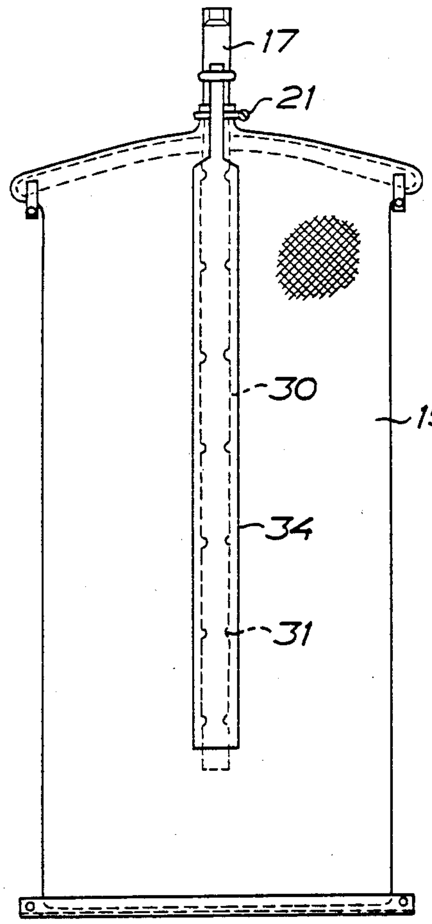
Figure 6:
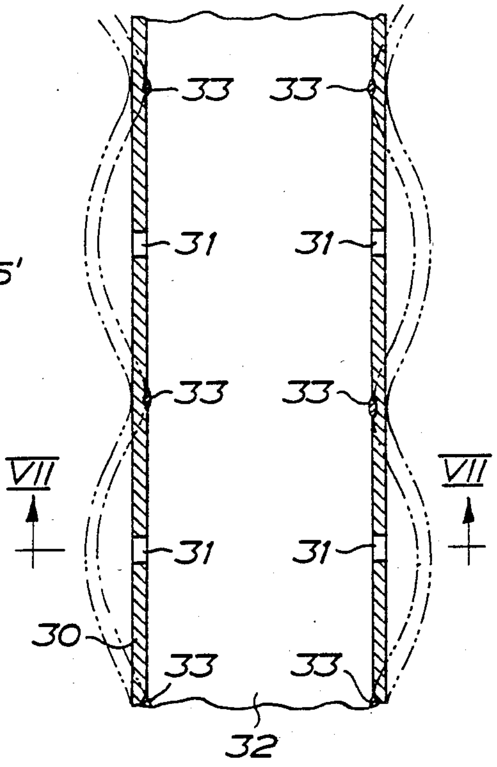
Figure 7:
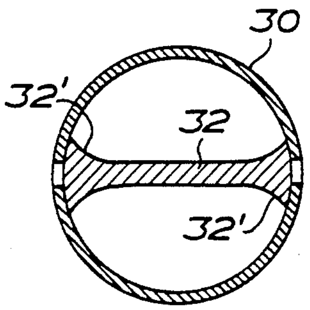
Figure 8:
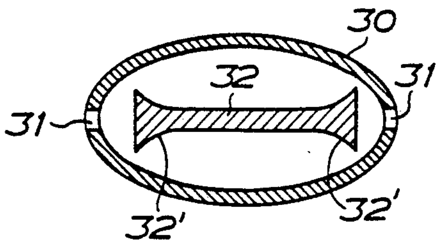

In order to explain the invention in more detail reference is made to the accompanying drawings, in which FIG. 1 is a transparent perspective view of a silo having an activator according to the invention, in one embodiment thereof, FIG. 2 is an enlarged plan view of the activator in FIG. 1, FIG. 3 is an enlarged axial cross-sectional view of the activator in FIG. 1, along line III—III in FIG. 2, FIG. 4 is a plan view as that in FIG. 2 of another embodiment of the activator, FIG. 5 is a reduced plan view of a modification of the embodiment in FIG. 4, FIG. 6 is an enlarged fragmentary axial sectional view of a flexible tube included in the embodiment of FIG. 5 for the supply of pressurized gas pulses, FIG. 7 is a cross-sectional view along line VII—VII in FIG. 6 showing the flexible tube in one operational condition thereof, and FIG. 8 is a cross-sectional view as that in FIG. 7 of the flexible tube in another operational condition thereof.

In FIG. 1 there are provided in the conical bottom portion 11 of a silo 10 two activators 12 for fluidizing slow-moving material in the silo. As shown with regard to one of the activators this activator is connected to a flexible tube or tube conduit 13, e.g. for pressurized air, the connection being effected via a pulsator 14 which is shown to be located inside the silo close to the activator but could as well be located outside the silo.

The activator comprises according to FIGS. 2 and 3 a substantially triangular flat activator hose 15 of fabric preferably of synthetic material which is sewnup along the margins thereof and can consist of two identical layers, a front layer and a rear layer, of gas-permeable fabric. However, the rear layer can be of another construction than the front layer and can be less permeable than the front layer or even consist of a material which is completely impermeable to gas. The activator hose is suspended on a support element formed like a coathanger and consisting of a yoke 16 and a socket 17, the yoke being curved 1n the embodiment shown but may also be angled at each side of the socket. The yoke is inserted into the activator hose 15 which for this purpose can be opened at a zipper 18 at the front side of the hose or at the rear side thereof. The socket 17 extends into the space between the two layers of the activator hose 15 through an opening 9 in the marginal seam and extends perpendicularly to the yoke 16 which is loosely received in a depression 20 in the socket. The activator hose 15 is sealed around the socket by means of a hose clamp 21. Inside the activator hose, the socket has a number of side openings 22 and moreover it is open at one end at 23. The socket 17 has at the outer end thereof a threaded portion 17′ for connection to the conduit 13.

By means of a quick-coupling 24 attached to the wall of the container 10 the activator is connected to the container wall. The quick-coupling encloses the socket 17. However, not only the socket but also a flat rail 25 located on top of the socket and extending in the axial direction thereof centrally above the activator hose 15 at the front side thereof is enclosed by the quick-coupling. The purpose of said flat rail is to depress the hose against the inside surface of the container wall.

The free end of the rail can be attached against the inside surface of the container wall by means of a clip 26 fixed by screws to the container wall, and also the yoke 16 can be attached to the container wall at the ends thereof by means of clips 27. These clips can be arranged such that it is not necessary to unscrew the clips when the activator is to be dismounted. The activator can be slid under the clips and can be kept in place by means of the quick-coupling 24. This coupling should be of a known easily operated and reliable construction.

In the preferred embodiment, the yoke 16 has a flat preferably oval cross-sectional form, and the yoke can be tubular or solid. Due to the fact that the yoke is curved or angled at each side of the socket and also due to the possibility of rotating the yoke in the depression in the socket, it is possible to adapt at the mounting the activator to the shape of the surface against which the activator is to be mounted. This surface can be planar or curved or it can form a corner; one and the same yoke can be used. The only thing to do is to adjust the yoke to a suitable rotated position. The adaptability can be further increased by making the yoke flexible so that it can be adapted in situ to the shape of the container by suitable bending. The rail 25 can be formed as a tube having circular or flat rectangular cross-sectional form but preferably the rail comprises a flat U-section. Finally, in the preferred embodiment the socket 17 has the lowest possible cross section; the cross section can be circular, oval or rectangular.

As will be seen, the activator of the invention is of a simple construction add can be easily mounted. Above all, it is possible to remove easily the activator hose 15 for replacement, cleaning or disinfection. The activator of the invention operates in the same manner as the panel activator discussed above, but additionally it can be arranged in such a manner that blowing-off is obtained between the activator and the container wall as mentioned above. That is, gas supplied to the hose 15 is allowed to pass through the gas permeable back wall of the hose into the space between the back wall of the hose 15 and the inside surface of the container 10. The flow of gas into the space may cleanse the space of pulverulent material which may have penetrated between the hose and the inside surface of the container. This provides an additional advantage over prior art panel activators which do not provide means for cleansing the space between the panel and the inside surface of the container wall.

Principally, the activator of FIG. 4 is constructed in the same manner as that in FIGS. 1 to 3, but in this case the activator hose 15′ has rectangular shape. In order to depress the activator hose against the container wall the rail 25 is supplemented by a cross bar 28 which is connected to the container wall, and the bottom clip is replaced by a rail 29.

When the activator is to be used for fluidizing heavy powders such as sand and metal oxides, just to mention two examples, it may occur that the fluidizing action ceases when the level of the material in the container has decreased to a position below the lower end of the socket 17, because the pressurized gas pulses then no longer will pass into the material through the gas-permeable activator hose but will follow the line of least resistance and escape totally to the empty space above the material. The embodiment shown in FIGS. 5 to 8 has been constructed in order to eliminate this drawback.

Referring to FIGS. 5 to 8, the activator shown in its entirety in FIG. 5 is substantially of the same embodiment as the activator in FIG. 4. The socket 17 in this case does not extend into the activator hose 15′. It is provided with a flexible tube 30 connected to the socket 17, said tube being fixed to the socket by means of the hose clamp 21. The flexible tube 30 is closed at the inner end thereof and has a number of circular side openings 31 regularly spaced over the axial length of the tube. The construction of the flexible tube is shown in more detail in FIGS. 6 to 8. The tube comprises a relatively thin but not flimsy rubber hose in which there is located a rigid cross wall 32 also of rubber, which is disposed diametrically in the rubber hose and is connected therewith by spot vulcanization at 33 while the cross wall between the vulcanization spots 33 is loose in relation to the rubber hose. The openings 31 are located substantially midway between the spots 33. The cross wall 32 is thickened at the ends thereof at 32′ such that the edge surface well covers the openings 31. When the rubber hose 30 is under pressure by means of the pressurized gas pulses and it is left as it is, i.e. there is no pulverulent material pressing against the outside surface thereof, the wall of the rubber hose between the vulcanization spots 33 engages the edge surfaces of the cross wall 32, the cross wall as a consequence thereof keeping the openings 31 closed. This condition is shown in FIG. 7. However, if a pressure is exerted from the outside against the rubber hose 30, said hose will be deformed between the vulcanization spots 33 such that the wall of the rubber hose will take the form shown by dot and dash lines in FIG. 6. Then, the wall of the rubber hose will be lifted from the edge surface of the cross wall 32 in the regions of the openings 31 as is shown in FIG. 8 such that pressurized gas pulses can escape unobstructedly from the openings 31. This means that when the activator is mounted in a container and this container is filled with material, the material by the weight thereof will maintain the rubber hose 30 in the condition according to FIG. 8 such that the pressurized gas pulses can pass into the activator hose 15' through the openings 31 then to penetrate through the activator hose into the material so as to fluidize the material. As the level of the material decreases in the container, the pressure against the rubber hose 30 will be reduced above the level of the material; the openings 31 then will be closed one after the other by the wall of the rubber hose engaging the edge surface of the cross wall 32 according to FIG. 7. Thus, the pressurized gas pulses will be controlled only to some extent by the activator which is still covered by the material.

It may be necessary to arrange a pressure panel over the rubber hose 30 and this is shown in FIG. 5 wherein the rail 25 according to FIG. 4 has been replaced by a rail 34 of a resiliently flexible material such that the rail will be deformed under the weight of the material in the container so as to transmit the pressure of the material to the rubber hose 30, but will then progressively spring back when the pressure of the material ceases. The rail 34 should be perforated so as not to obstruct the passage of the pressurized gas pulses, and it can be combined with a rail at the lower side of the rubber hose 30.

Further embodiments are conceivable by applying the principle construction of the activator characterizing the invention.

I claim:

1. Activator for fluidizing slow-moving material in containers (10), comprising a flat element (15) to be applied against the inside surface of the container wall and having a space defined between a front layer and a rear layer, which is closed at the margins of the element and has a connection (17, 30) for the supply of pressurized gas pulses to the space, the front layer intended to face the interior of the container, being gas-permeable and being movable in relation to the rear layer so as to allow transmission of pressurized gas pulses when supplied, to the material in the container, a rhythmical movement of the front layer in relation to the rear layer simultaneously being obtained in pace with the pressurized gas pulses, characterized in that the two layers are arranged as a flat activator hose (15) which is loosely suspended on a support member (16) with the connection for the supply of pressurized gas pulses arranged as a conduit (17, 30) projecting into the activator hose between the layers thereof with the conduit (17, 30) comprising a socket (17) arranged substantially centrally on the support member (16) and with said support member comprising a yoke (16) extending transversely of the socket (17), said yoke being curved or angled at each side of the socket and terminating at free ends.

2. Activator as claimed in claim 1, characterized in that one or more rail members (25) are engaged with the outside surface of the activator hose so as to limit the movement of the front layer in relation to the rear layer under the influence of the pressurized gas pulses.

3. Activator as claimed in claim 1, characterized in that the activator hose (15) is provided with closable means for selectively providing access to an interior of said hose (15).

4. Activator as claimed in claim 1, characterized in that both layers are gas-permeable.

5. Activator as claimed in claim 4, characterized in that the rear layer is less gas permeable than the front layer.

6. Activator as claimed in claim 1, characterized in that the rear layer is non-permeable to gas.

7. Activator as claimed in claim 2, characterized in that the rail member (25) is connected to the socket (17) and extends axially of the socket (17) centrally of the activator hose (15).

8. Activator as claimed in claim 7, characterized by a quick-coupling (24) for connecting the socket (17) to the container wall.

9. Activator as claimed in claim 1, characterized in that the conduit (30) inside the activator hose (15') has axially spaced pressure actuated normally closed openings (31) individually actuated by pressure on said hose at said openings whereby said openings are sequentially closed in descending order as a layer of material in said container descends and sequentially relieves pressure on said openings.

* * * * *

UNITED STATES PATENT AND TRADEMARK OFFICE
CERTIFICATE OF CORRECTION

PATENT NO. : 4,591,075

DATED : May 27, 1986

INVENTOR(S) : Hans E. Eriksson

It is certified that error appears in the above-identified patent and that said Letters Patent is hereby corrected as shown below:

Column 3, line 26, "ln" should be --in--;

Column 3, line 32, "9" should be --19--; and

Column 4, line 11, "add" should be --and--.

Signed and Sealed this

*Second* Day of *September 1986*

[SEAL]

*Attest:*

DONALD J. QUIGG

*Attesting Officer* *Commissioner of Patents and Trademarks*